United States Patent
Lee et al.

(10) Patent No.: US 10,962,020 B2
(45) Date of Patent: Mar. 30, 2021

(54) COMPRESSOR AND CHILLER SYSTEM INCLUDING SAME

(71) Applicant: LG ELECTRONICS INC., Seoul (KR)

(72) Inventors: Kiwook Lee, Seoul (KR); Seongmin Jang, Seoul (KR); Jinhee Jeong, Seoul (KR); Chanmyung Park, Seoul (KR); Solji Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 16/329,180

(22) PCT Filed: Oct. 21, 2016

(86) PCT No.: PCT/KR2016/011894
§ 371 (c)(1),
(2) Date: May 31, 2019

(87) PCT Pub. No.: WO2018/043797
PCT Pub. Date: Mar. 8, 2018

(65) Prior Publication Data
US 2019/0277300 A1    Sep. 12, 2019

(30) Foreign Application Priority Data
Aug. 30, 2016 (KR) .................. 10-2016-0110583

(51) Int. Cl.
*F04D 29/058* (2006.01)
*F04D 29/056* (2006.01)
(Continued)

(52) U.S. Cl.
CPC ........... *F04D 29/058* (2013.01); *F04D 17/10* (2013.01); *F04D 29/05* (2013.01); *F04D 29/051* (2013.01);
(Continued)

(58) Field of Classification Search
CPC ...... F04D 29/058; F04D 29/051; F04D 17/10; F04D 29/05; F04D 29/056; F25B 31/00;
(Continued)

(56) References Cited

U.S. PATENT DOCUMENTS 5,924,847 A    7/1999  Scaringe et al.
2003/0038553 A1    2/2003  Andres et al.
(Continued)

FOREIGN PATENT DOCUMENTS

EP    2677176 A1    12/2013
EP    2784326 A1    10/2014
(Continued)

OTHER PUBLICATIONS

English translation of KR20130139076; printed from EPO website on Oct. 8, 2020 (Year: 2020).*

*Primary Examiner* — Bryan M Lettman
(74) *Attorney, Agent, or Firm* — Dentons US LLP (57) ABSTRACT

A compressor including a motor having a rotary shaft, a rotor and a stator, and an impeller at a front end of the rotary shaft to suction refrigerant in an axial direction and compress the refrigerant in a centrifugal direction. The compressor has a collar at a rear end of the rotary shaft and coupled to the rotary shaft to be extended outwardly in a radial direction of the rotary shaft. Radial bearings support a radial movement of the rotary shaft at a front and rear of the stator. A thrust bearing prevents an axial movement of the rotary shaft. A mechanical backup bearing also prevents the axial movement of the rotary shaft. A fixing unit supports the backup bearing at the rear end of the rotary shaft, wherein the backup bearing is arranged to overlap the thrust bearing in the radial direction of the rotary shaft.

17 Claims, 3 Drawing Sheets

(51) Int. Cl.
*F25B 31/02* (2006.01)
*F04D 29/05* (2006.01)
*F25B 31/00* (2006.01)
*F04D 17/10* (2006.01)
*F04D 29/051* (2006.01)

(52) U.S. Cl.
CPC ............ *F04D 29/056* (2013.01); *F25B 31/00* (2013.01); *F25B 31/026* (2013.01); *F05B 2240/51* (2013.01); *F16C 2360/44* (2013.01)

(58) Field of Classification Search
CPC .... F25B 31/026; F16C 2360/44; F16C 17/20; F16C 17/10; F16C 17/107; F16C 17/26; F05B 2240/51; H02K 7/09
See application file for complete search history.

(56) References Cited

U.S. PATENT DOCUMENTS

| | | | |
|---|---|---|---|
| 2004/0189126 A1* | 9/2004 | Brunet | H02K 1/28 310/90.5 |
| 2008/0124233 A1 | 5/2008 | Spooner | |
| 2008/0185928 A1 | 8/2008 | Buhler | |
| 2010/0014990 A1 | 1/2010 | Nijhuis | |
| 2012/0063918 A1 | 3/2012 | de Larminat et al. | |
| 2014/0023534 A1* | 1/2014 | Ramdane | F16C 32/0495 417/420 |
| 2014/0216087 A1* | 8/2014 | Sishtla | F04D 29/162 62/228.1 |
| 2016/0061210 A1* | 3/2016 | Hasegawa | F04D 29/052 62/498 |

FOREIGN PATENT DOCUMENTS

| | | |
|---|---|---|
| JP | S63-198796 A | 8/1988 |
| JP | 11-303868 A | 11/1999 |
| JP | 2015-094259 A | 5/2015 |
| KR | 10-2006-0081791 A | 7/2006 |
| KR | 10-2013-0001221 A | 1/2013 |
| KR | 10-2013-0139076 A | 12/2013 |
| KR | 20130139076 * | 12/2013 |
| KR | 10-2014-0137346 A | 12/2014 |

* cited by examiner

COMPRESSOR AND CHILLER SYSTEM INCLUDING SAME

This application is a National Stage Application of International Application No. PCT/KR2016/011894, filed on Oct. 21, 2016, which claims the benefit of Korean Patent Application No. 10-2016-0110583, filed on Aug. 30, 2016, all of which are hereby incorporated by reference in their entirety for all purposes as if fully set forth herein.

TECHNICAL FIELD

The present invention relates to a compressor and a chiller system including the same, and more particularly, to a compressor and a chiller system including the same, in which the production cost may be reduced by reducing a length of a rotary shaft provided in the compressor and a resonant frequency of the rotary shaft may be enhanced to make sure of a safety rate.

BACKGROUND ART

Generally, a chiller system is a cooling system or refrigerating system, which supplies cool water to a cool water demand source such as an air conditioner or a freezer, and is provided to circulate a refrigerant through a compressor, a condenser, an expansion valve and an evaporator.

The evaporator of the chiller system is a water-refrigerant heat exchanger, and is provided to cool the cool water by heat-exchanging the refrigerant passing through the evaporator and the cool water heat-exchanged by a heat-exchanger of the air-conditioner or the freezer.

Also, the condenser of the chiller system is a water-refrigerant heat exchanger, and is provided to cool the refrigerant by heat-exchanging the refrigerant passing through the condenser and the cool water heat-exchanged by a water cooling system.

The compressor provided in the chiller system is formed to compress the refrigerant and provide the compressed refrigerant to the condenser. The compressor may include an impeller compressing the refrigerant, a rotary shaft connected to the impeller, and a motor rotating the rotary shaft.

The compressor may be provided with a thrust bearing to prevent an axial movement of the rotary shaft.

Figure 1:
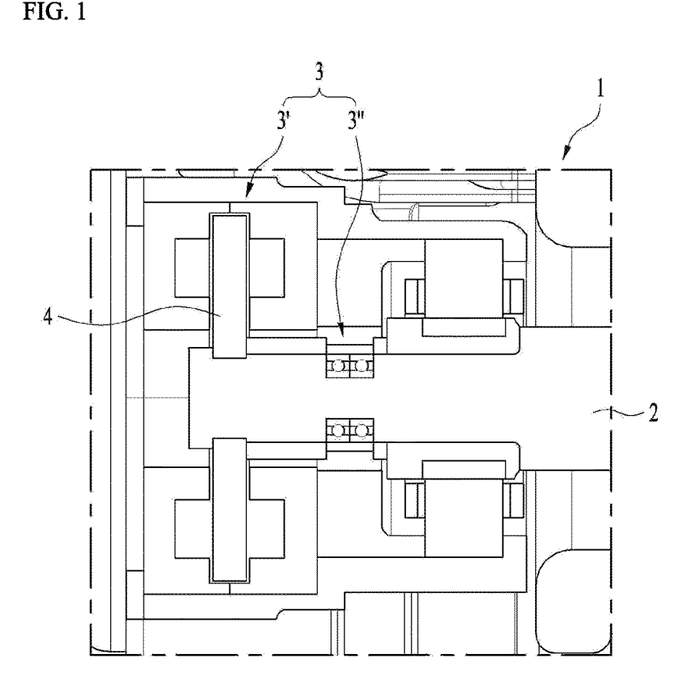
FIG. 1 is a view illustrating a compressor of the related art.

FIG. 1 illustrates a compressor of the related art. In detail, FIG. 1 illustrates a thrust bearing provided in a compressor formed to drive a chiller system of the related art.

Referring to FIG. 1, the compressor 1 of the related art includes a rotary shaft 2 formed to forward a driving force of the motor to the impeller, and a thrust bearing 3 formed to support an axial (or longitudinal) movement of the rotary shaft 2.

The thrust bearing 3 may include a magnetic bearing 3' and a mechanical backup bearing 3".

A collar 4 is coupled to the rotary shaft 2 to outwardly protrude along a radial direction of the rotary shaft 2.

The magnetic bearing 3' may be formed to be supplied with an outer power source, and if a power source is supplied to the magnetic bearing 3', a magnetic field may be generated in the magnetic bearing 3'.

A movement of the collar 4, which depends on a length direction of the rotary shaft 2, may be avoided by the magnetic force generated from the magnetic bearing 3'. That is, a longitudinal movement of the rotary shaft 2 may be avoided by the magnetic force generated from the magnetic bearing 3'.

The mechanical backup bearing 3" corresponds to an element for protecting the magnetic bearing 3' when a disturbance such as a power failure occurs.

That is, if a disturbance such as a power failure occurs, the magnetic force is not generated from the magnetic bearing 3'. In this case, the collar 4 may collide with the magnetic bearing 3', whereby the magnetic bearing 3' may be damaged.

However, if a disturbance such as a power failure occurs, the backup bearing 3" may prevent the collar 4 from colliding with the magnetic bearing 3' and thus prevent the magnetic bearing 3' from being damaged.

Meanwhile, according to the compressor 1 of the related art, the magnetic bearing 3' and the backup bearing 3" are arranged to be spaced apart from each other along the length direction of the rotary shaft 2. In this case, a problem occurs in that the rotary shaft 2 should make sure of its length equivalent to those of the magnetic bearing 3' and the backup bearing 3".

Also, if the rotary shaft 2 becomes longer, problems occur in that the material cost may be increased and a resonant frequency of the rotary shaft 2 is relatively low. It is safe that the rotary shaft 2 is rotated within a range less than the resonant frequency. A low resonant frequency of the rotary shaft 2 may mean that it is difficult to rotate the rotary shaft 2 at high speed.

That is, if the rotary shaft 2 becomes longer, the resonant frequency of the rotary shaft is lowered, whereby a problem occurs in that safety of the compressor 1 is relatively lowered.

DISCLOSURE

Technical Problem

An object of the present invention devised to solve one or more problems due to limitations and disadvantages of the related art is to provide a compressor and a chiller system including the same in which a length of a rotary shaft may be reduced through an optimal arrangement of a magnetic bearing and a mechanical backup bearing.

Another object of the present invention is to provide a compressor and a chiller system including the same in which the material cost required for a rotary shaft may be reduced by reducing a length of the rotary shaft of the compressor.

Other object of the present invention is to provide a compressor and a chiller system including the same in which a resonant frequency of a rotary shaft may be enhanced and at the same time driving safety of the compressor may be improved by reducing a length of a rotary shaft of the compressor.

Technical Solution

To achieve these objects and other advantages and in accordance with the purpose of the invention, a compressor comprises one or more impellers for suctioning a refrigerant in an axial direction and compressing the same in a centrifugal direction; a rotary shaft formed to rotate the impeller; a collar coupled to the rotary shaft to be extended outwardly in a radial direction of the rotary shaft; a thrust magnetic bearing formed to prevent an axial movement of the rotary shaft from occurring by supporting the collar by means of a magnetic field; and a mechanical backup bearing formed to prevent the axial movement of the rotary shaft from occurring, wherein the backup bearing is arranged to partially overlap the thrust magnetic bearing in the radial direction of the rotary shaft.

The rotary shaft may include first and second step difference portions formed at one end, and the collar may be coupled to the first step difference portion and the backup bearing may be arranged at the second step difference portion.

For example, the second step difference portion may be arranged at the rear of the first step difference portion.

Preferably, the first step difference portion and the second step difference portion are formed continuously toward the rear end of the rotary shaft.

The first step difference portion may be formed to have a step difference from an outer circumference of the rotary shaft to an inner side along the radial direction of the rotary shaft, and the second step difference portion may be formed to have a step difference from the first step difference portion to the inner side along the radial direction of the rotary shaft.

The first step difference portion may include a first horizontal plane extended in the axial direction and a first vertical plane extended in the radial direction of the rotary shaft, the second step difference portion may include a second horizontal plane extended in the axial direction and a second vertical plane extended in the radial direction of the rotary shaft.

In this case, a rear end of the first horizontal plane and a top end of the second vertical plane may adjoin each other.

Preferably, a first gap between a front plane of the collar and an opposite plane of the thrust magnetic bearing, which faces the front plane of the collar, may be greater than a second gap between a front plane of the backup bearing and the second vertical plane which faces the front plane of the backup bearing.

The thrust magnetic bearing may include a first magnetic bearing arranged at the front of the collar and a second magnetic bearing arranged at the rear of the collar.

In this case, the first gap may be a distance between the front plane of the collar and the opposite plane of the first magnetic bearing, which faces the front plane of the collar.

The backup bearing may be arranged to overlap the second magnetic bearing in the radial direction of the collar.

A length along an axial direction of the backup bearing is smaller than a length along an axial direction of the second magnetic bearing.

The backup bearing may be arranged to be spaced apart from the second magnetic bearing in a direction toward the inner side of the radial direction of the rotary shaft.

The compressor according to the present invention may further comprise a radial bearing formed to support the rotary shaft with respect to a radial movement of the rotary shaft.

Meanwhile, the present invention provides a chiller system comprising a compressor including one or more impellers for suctioning a refrigerant in an axial direction and compressing the same in a centrifugal direction, a rotary shaft formed to rotate the impeller, and a thrust bearing formed to support the rotary shaft with respect to a longitudinal movement of the rotary shaft; a condenser condensing the refrigerant by heat-exchanging the refrigerant compressed by the compressor with cooling water; an expansion valve expanding the refrigerant condensed by the condenser; and an evaporator evaporating the refrigerant by heat-exchanging the refrigerant expanded by the expansion valve with the cool water and cooling the cool water, wherein the thrust bearing includes a thrust magnetic bearing supporting a collar, which is extended outwardly along a radial direction of the rotary shaft, by means of a magnetic field, and a mechanical backup bearing formed to prevent an axial movement of the rotary shaft from occurring, and the backup bearing is arranged to partially overlap the thrust magnetic bearing in the radial direction of the rotary shaft.

The rotary shaft may include first and second step difference portions formed at one end, and the collar may be coupled to the first step difference portion and the backup bearing may be arranged at the second step difference portion.

The second step difference portion may be arranged at the rear of the first step difference portion, and it is preferable that the first step difference portion and the second step difference portion are formed continuously toward the rear end of the rotary shaft.

The first step difference portion may be formed to have a step difference from an outer circumference of the rotary shaft to an inner side along the radial direction of the rotary shaft, and the second step difference portion may be formed to have a step difference from the first step difference portion to the inner side along the radial direction of the rotary shaft.

The first step difference portion may include a first horizontal plane extended in the axial direction, and a first vertical plane extended in the radial direction of the rotary shaft, and the second step difference portion may include a second horizontal plane extended in the axial direction, and a second vertical plane extended in the radial direction of the rotary shaft.

In this case, a rear end of the first horizontal plane and a top end of the second vertical plane may adjoin each other.

Preferably, a first gap between a front plane of the collar and an opposite plane of the thrust magnetic bearing, which faces the front plane of the collar, is greater than a second gap between a front plane of the backup bearing and the second vertical plane which faces the front plane of the backup bearing.

The thrust magnetic bearing may include a first magnetic bearing arranged at the front of the collar and a second magnetic bearing arranged at the rear of the collar, and the backup bearing may be arranged to overlap the second magnetic bearing in the radial direction of the rotary shaft.

Advantageous Effects

According to the present invention, a compressor and a chiller system including the same may be provided, in which a length of a rotary shaft may be reduced through an optimal arrangement of a magnetic bearing and a mechanical backup bearing.

Also, according to the present invention, a compressor and a chiller system including the same may be provided, in which the material cost required for a rotary shaft may be reduced by reducing a length of the rotary shaft of the compressor.

Also, according to the present invention, a compressor and a chiller system including the same may be provided, in which a resonant frequency of a rotary shaft may be enhanced and at the same time driving safety of the compressor may be improved by reducing a length of a rotary shaft of the compressor.

BRIEF DESCRIPTION OF THE DRAWINGS

(a) and (b) of FIG. 5 are enlarged views illustrating arrangement of a magnetic bearing and a mechanical backup bearing shown in FIG. 4.

MODE FOR CARRYING OUT THE INVENTION

Hereinafter, a turbo freezer according to one embodiment of the present invention will be described with reference to the accompanying drawings. Exemplary embodiments of the present invention are shown in the accompanying drawings, and although the accompanying drawings are provided to describe the present invention in more detail, the technical range of the present invention is not limited by the accompanying drawings.

Also, wherever possible, the same reference numbers will be used throughout the drawings to refer to the same or like parts, and their repeated description will be omitted. For convenience of description, size and shape of each element member shown in the drawings may be enlarged or downsized.

Meanwhile, although the terms such as "first" and/or "second" may be used to describe various elements, it is to be understood that the elements are not limited by such terms. The terms may be used to identify one element from another element.

Figure 2:
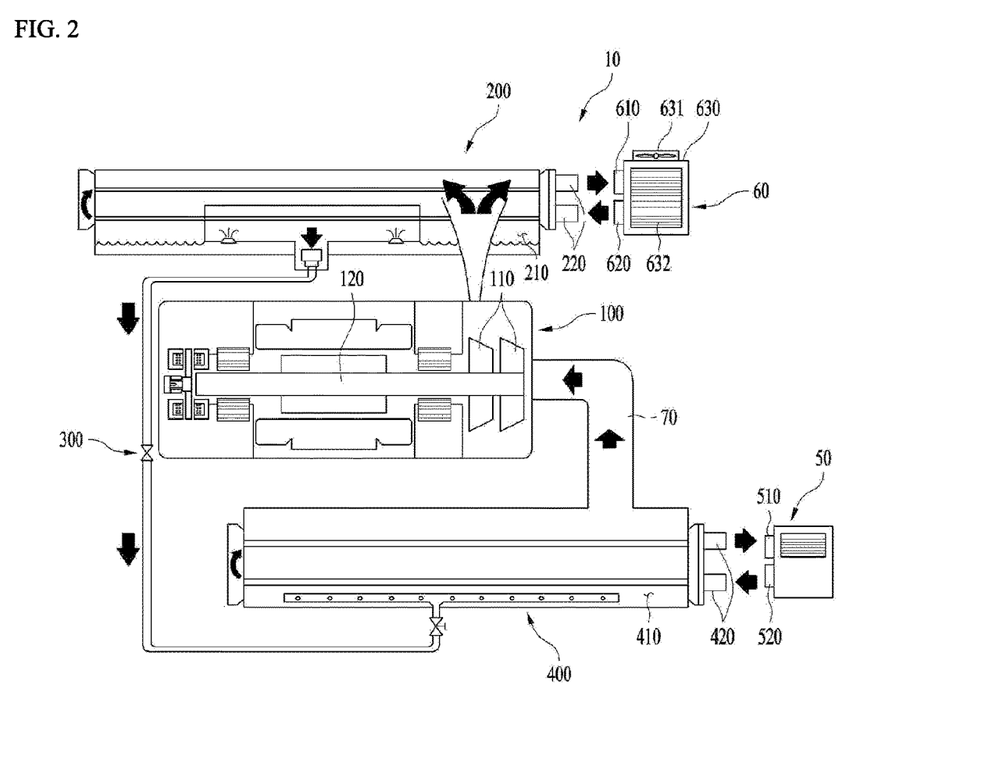
FIG. 2 is a view illustrating a chiller system according to the present invention.

FIG. 2 is a view illustrating a chiller system according to the present invention.

Referring to FIG. 2, the chiller system 10 according to the embodiment of the present invention may include a compressor 100 formed to compress a refrigerant, a condenser 200 formed to condense the refrigerant by heat-exchanging the refrigerant compressed by the compressor 100 with the cooling water, an expansion valve 300 formed to expand the refrigerant condensed by the condenser 200, and an evaporator 400 formed to evaporate the refrigerant and cool the cool water by heat-exchanging the refrigerant expanded by the expansion valve 300 with the cool water.

Also, the chiller system 10 according to the embodiment of the present invention may further include an air conditioning unit 50 cooling the air of an air-conditioning space by heat-exchanging the cool water cooled by the evaporator 400 with the air of the air-conditioning space, and a cooling unit 60 formed to cool the cooling water heat-exchanged with the refrigerant by the condenser 200.

The condenser 200 may be formed to condense the refrigerant by emitting heat of the refrigerant compressed by the compressor 100 to the cooling water. That is, the condenser 200 may be formed to condense the refrigerant by heat-exchanging the cooling water supplied from the cooling unit 60 with the refrigerant supplied through the compressor 100.

For example, the condenser 200 may be comprised of a shell-tube type heat exchanger. At this time, a condensing space 210 where the refrigerant can be condensed may be formed inside a shell of the condenser 200, and a cooling water tube 220 through which the cooling water passes may be arranged in the condensing space 210. The cooling water tube 220 may be connected to a cooling water inlet pipe 610 and a cooling water outlet pipe 620 of the cooling unit 60, whereby the cooling water may move therethrough.

The cooling unit 60 is formed to cool the cooling water which has absorbed heat from the refrigerant of the condenser 200. The cooling unit 60 includes the cooling water inlet pipe 610 through which the cooling water enters and the cooling water outlet pipe 620 through which the cooling water flows out.

For example, the cooling unit 60 may include a cooling tower for air-cooling the cooling water which has absorbed from the refrigerant of the condenser 200.

At this time, the cooling unit 60 may include a main body unit 630 having an air outlet 631 formed at an upper portion and an air inlet 632 formed at a side, a ventilating fan (not shown) provided in the air outlet 631, forcibly discharging the outer air through the air outlet 631 after forcibly inhaling the outer air toward the inside of the main body unit 630, a cooling water inlet pipe (not shown) provided at an upper portion inside the main body unit 630, spraying the cooling water heat-exchanged by the condenser 200 toward a lower portion inside the main body unit 630, and a cooling water collecting unit for collecting the cooling water sprayed from the cooling water inlet pipe and cooled by heat exchange with the outer air.

The evaporator 400 may be formed to evaporate the refrigerant by supplying heat to the refrigerant expanded by the expansion valve 300. That is, the evaporator 400 may be formed to heat-exchange the cool water supplied from the air-conditioning unit 50 with the refrigerant to evaporate the refrigerant.

For example, the evaporator 400 may be comprised of a shell tube type heat exchanger. At this time, an evaporating space 410 where the refrigerant may be evaporated may be formed inside a shell of the evaporator 400. Also, a cool water tube 420 through which the cool water passes may be arranged in the evaporating space 410. The cool water tube 420 may be connected to a cool water inlet pipe 510 and a cool water outlet pipe 520, which are connected from the air-conditioning unit 50, to move the cool water.

The refrigerant evaporated by the evaporator 400 may be inhaled into an inlet pipe 70 of the compressor 100 and compressed by the compressor 100.

The air-conditioning unit 50 may include a heat exchanger (not shown) for heat-exchanging the cool water cooled by supplying heat to the refrigerant of the evaporator 400 with the air of the air-conditioning space, the cool water inlet pipe 510 through which the cool water enters the air-conditioning unit 50 from the evaporator 400, and the cool water outlet pipe 520 through which the cool water flows out from the air-conditioning unit 50 to the evaporator 400.

The compressor 100 may be formed to compress the refrigerant evaporated by the evaporator 400. For example, the compressor 100 may include a rotary shaft 120, and an impeller 110 provided at a front end of the rotary shaft 120.

The impeller 110 may be rotated in conjunction with rotation of the rotary shaft 120. Therefore, if the rotary shaft 120 is rotatably driven, the impeller 110 is rotated, whereby the refrigerant entering the compressor 100 may be compressed.

Hereinafter, the aforementioned compressor 100 will be described in more detail with reference to another drawing.

Figure 3:
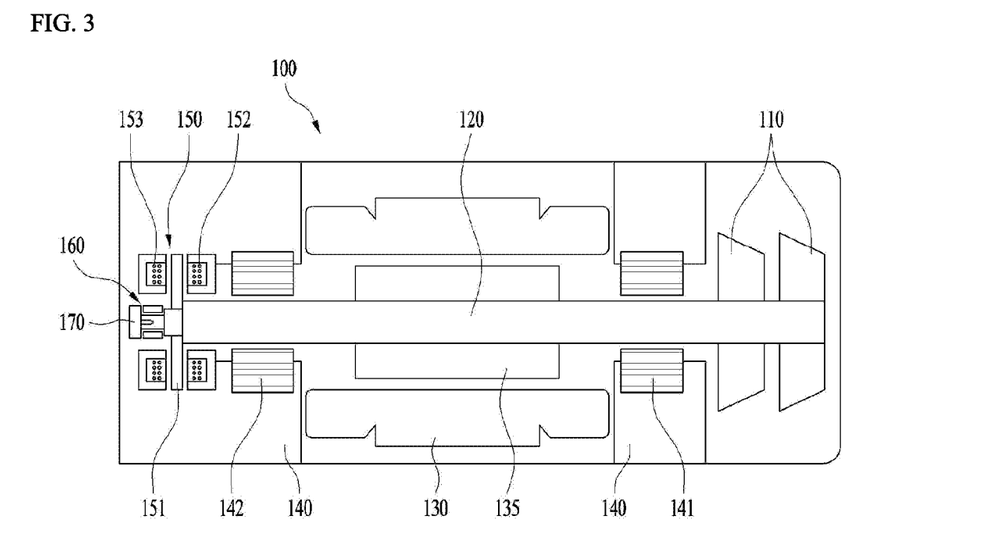
FIG. 3 is a brief view illustrating a compressor provided in the chiller system of FIG. 2.

FIG. 3 is a brief view illustrating a compressor provided in the chiller system of FIG. 2. That is, FIG. 3 is a conceptual view of a compressor provided in the chiller system.

Referring to FIG. 3, the compressor 100 provided in the chiller system 10 may include at least one impeller 110, a rotary shaft 120 transferring a rotation power to the impeller 110, a rotor 135 coupled to the circumference of the rotary shaft 120, and a stator 130 provided along the circumference of the rotor 135.

That is, the rotary shaft 120, the rotor 135 and the stator 130 may constitute a motor, and the compressor 100 may be formed in such a manner that the impeller 110 is provided at a front end of the motor.

The impeller 110 may be formed to inhale the refrigerant in an axial direction and compress the refrigerant in a centrifugal direction. The refrigerant compressed by the impeller 110 is supplied to the condenser 20.

The rotor 135 may be arranged along the circumference of the rotary shaft 120, and may be rotated by a magnetic field generated from the stator 130. If the rotor 135 is rotated, the rotary shaft 120 may be rotated together with the rotor 135.

The stator 130 is an element for making a magnetic field, and may be comprised of an electromagnet or permanent magnet.

That is, the stator 130 and the rotor 135 may be formed to provide a driving force for rotating the impeller 110 to the rotary shaft 120. The rotary shaft 120 may be formed to rotate the impeller 110. That is, the impeller 110 may be provided at the front end of the rotary shaft 120, and may be rotated together with the rotary shaft 120.

The compressor 100 may include one or more radial bearings 141 and 142 formed to support a radial movement of the rotary shaft 120. The radial bearings 141 and 142 may be arranged to partially surround the rotary shaft 120.

The radio bearings 141 and 142 may be formed as a magnetic bearing or ball bearing. If the radial bearings 141 and 142 are formed of magnetic bearings, the radial movement of the rotary shaft 120 may be controlled through a current applied to the radial bearings 141 and 142.

Also, the radial bearings 141 and 142 may be formed to surround the rotary shaft 120 at the front and rear of the stator 130.

The compressor 100 may further include thrust bearings 150 and 160 formed to support an axial movement (that is, longitudinal movement) of the rotary shaft 120.

The aforementioned radial bearings 141 and 142 and the thrust bearings 150 and 160 may be provided in a bearing housing 140. That is, the radial bearings 141 and 142 and the thrust bearings 150 and 160 may be provided in the bearing housing 140 arranged to surround the rotary shaft 120.

If the impeller 110 is rotated, a thrust toward the impeller 110 may be generated in the rotary shaft 120. For example, since the impeller 110 may be arranged at the front end of the rotary shaft 120, if the impeller 110 is rotated, a thrust toward the front of the rotary shaft 120 may be generated.

At this time, the thrust bearings 150 and 160 may be formed to prevent the axial movement of the rotary shaft 120 from occurring.

In detail, the thrust bearings 150 and 160 may include a thrust magnetic bearing 150 and a mechanical backup bearing 160.

The thrust magnetic bearing 150 may be formed to control the axial movement of the rotary shaft 120 through a magnetic field. For example, the thrust magnetic bearing 150 may control the axial movement of the rotary shaft 120 by controlling a current applied thereto.

In detail, wires 152 and 153 are wound in the thrust magnetic bearing 150, and the axial movement of the rotary shaft 120 may be controlled through a control of a current flowing to the wires 152 and 153.

In the rotary shaft 120, a collar 151 may be coupled to a position corresponding to the thrust magnetic bearing 150. The collar 151 may be coupled to the rotary shaft 120 such that the collar 151 may be extended outwardly toward a radial direction of the rotary shaft 120. The collar 151 may be formed of a magnetic body.

The thrust magnetic bearing 150 may be formed to support the collar 151 by means of a magnetic field. That is, the thrust magnetic bearing 150 may control the axial movement of the rotary shaft 120 by controlling a movement of the collar 151 by means of the magnetic field.

The mechanical backup bearing 160 may be formed to restrict the axial movement of the rotary shaft 120 through a gap between a backup bearing installation unit and the backup bearing 160.

At this time, the backup bearing 160 may be arranged to partially overlap the thrust magnetic bearing 150 in the radial direction of the rotary shaft 120.

Therefore, according to the present invention, since it is not necessary to make sure of the length of the rotary shaft 120 for installation of the backup bearing 160, the length of the rotary shaft 120 provided in the compressor 100 of the present invention may be reduced as compared with the compressor of the related art.

The aforementioned thrust magnetic bearing and the backup bearing will be described in more detail with reference to still another drawing.

Figure 4:
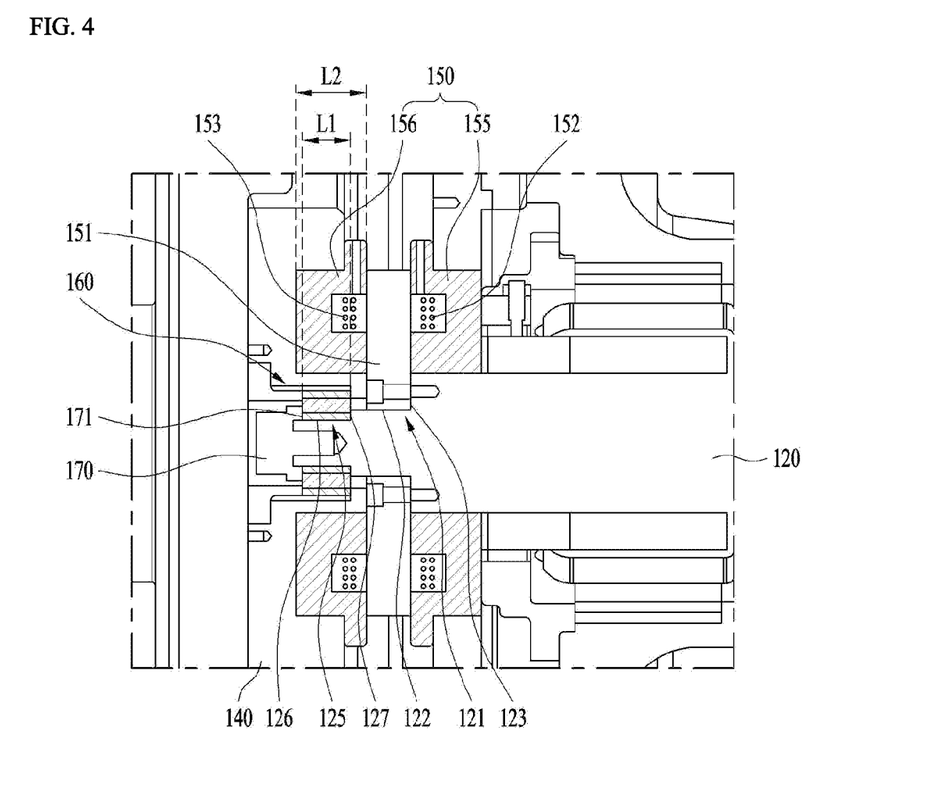
FIG. 4 is an enlarged view illustrating a thrust bearing provided in the compressor of FIG. 3.

FIG. 4 is an enlarged view illustrating a thrust bearing provided in the compressor of FIG. 3. That is, FIG. 4 illustrates the thrust bearing provided in the compressor according to the present invention in more detail.

Referring to FIG. 4, the rotary shaft 120 may include first and second step difference portions 121 and 125 formed at one end of the rotary shaft 120.

At this time, the aforementioned collar 151 may be coupled to the first step difference portion 121, and the aforementioned backup bearing 160 may be arranged at the second step difference portion 125.

That is, the first step difference portion 121 to which the collar 151 is coupled and the second step difference portion 125 at which the backup bearing 160 is arranged may be formed in the rotary shaft 120.

At this time, the aforementioned impeller 110 may be provided at the front end of the rotary shaft 120, and the first step difference portion 121 and the second step difference portion 125 may be formed at the front end of the rotary shaft 120. This is because that the step difference portions are provided in the middle of a length direction except the rear end and the front end of the rotary shaft 120 and the rotary shaft 120 may be damaged due to stress concentrated on the portion where the step difference portions are formed.

In detail, the second step difference portion 125 may be arranged at the rear of the first step difference portion 121.

Since the thrust magnetic bearing 150 is arranged at the front end rear of the collar 151 coupled to the first step difference portion 121 and the backup bearing 160 is arranged at the second step difference portion 125, the thrust magnetic bearing 150 may be arranged to partially overlap the backup bearing 160 in the radial direction of the rotary shaft 120.

The first step difference portion 121 and the second step difference portion 125 may be formed continuously toward the rear end of the rotary shaft 120. That is, the first step difference portion 121 and the second step difference portion 125 may be formed sequentially toward the rear end of the rotary shaft 120.

The second step difference portion 125 may be formed to have a step difference from the first step difference portion 121 inwardly in the radial direction of the rotary shaft 120. That is, a diameter of the first step difference portion 121 may be smaller than that of the rotary shaft 120, and a diameter of the second step difference portion 125 may be smaller than that of the first step difference portion 121.

Through these shapes and arrangements of the first step difference portion 121 and the second step difference portion 125, the thrust magnetic bearing 151 is able to be arranged to partially overlap the rotary shaft 120 of the backup bearing 160 in the radial direction of the rotary shaft 120.

Also, if the second step difference portion 125 of which diameter is smaller than that of the first step difference portion 121 is arranged at the front of the first step difference portion 12, a stress is concentrated on the second step difference portion 125, whereby it is likely that the portion of the rotary shaft 120 where the second step difference portion 125 is damaged.

Therefore, although the first step difference portion 121 and the second step difference portion 125 are all formed at the front end of the rotary shaft 120, it is preferable that the second step difference portion 125 is arranged to be closer to the rear end of the rotary shaft 120 than the first step difference portion 121.

The first step difference portion 121 may be formed to have a step difference from the outer circumference of the rotary shaft 120 inwardly in the radial direction of the rotary shaft 120, and the second step difference portion 125 may be formed to have a step difference from the first step difference portion 121 inwardly in the radial direction of the rotary shaft 120.

Therefore, the diameter of the second step difference portion 125 may be smaller than that of the first step difference portion 121.

The first step difference portion 121 may include a first horizontal plane 122 which is extended in an axial direction, and a first vertical plane 123 which is extended in the radial direction of the rotary shaft 120. The first vertical plane 123 may be extended from the front end of the first horizontal plane 122 in the radial direction of the rotary shaft 120. In this case, the axial direction may be a length direction of the rotary shaft 120.

The second step difference portion 125 may include a second horizontal plane 126 which is extended in an axial direction, and a second vertical plane 127 which is extended in the radial direction of the rotary shaft 120. The second vertical plane 127 may be extended from the front end of the second horizontal plane 126 in the radial direction of the rotary shaft 120.

In this case, a rear end of the first horizontal plane 122 and a top end of the second vertical plane 127 may be arranged to adjoin each other. That is, the rear end of the first horizontal plane 122 and the top end of the second vertical plane 127 may meet each other.

In this way, the second step difference portion 125 may be arranged continuously at the rear of the first step difference portion 121.

Meanwhile, the thrust magnetic bearing 150 may include a first magnetic bearing 155 arranged at the front of the collar 151 and a second magnetic bearing 156 arranged at the rear of the collar 151.

Based on a current applied to the first magnetic bearing 155 and the second magnetic bearing 156, an axial position of the collar 151 arranged between the first magnetic bearing 155 and the second magnetic bearing 156 may be controlled.

In detail, a first wire 151 may be wound in the first magnetic bearing 155, and a second wire may be wound in the second magnetic bearing 156. At this time, by controlling the current flowing to the first wire 151 and the second wire 153, the position of the collar 151 may be controlled between the first magnetic bearing 155 and the second magnetic bearing 156.

The backup bearing 160 may be provided to overlap the second magnetic bearing 156 in the radial direction of the rotary shaft 120. That is, the backup bearing 160 may be arranged at the overlap position with the second magnetic bearing 156 in the radial direction of the rotary shat 120.

For example, a length L1 along an axial direction of the backup bearing 160 may be shorter than a length L2 along an axial direction of the second magnetic bearing 156. At this time, the backup bearing 160 may be arranged to fully overlap the second magnetic bearing 156 in the radial direction of the rotary shaft 120. That is, the backup bearing 160 may be arranged such that a full length L1 of the backup bearing 160 may be overlapped with the second magnetic bearing 156 in the radial direction of the rotary shaft 120.

Therefore, the length of the rotary shaft 120 may be reduced as much as at least a length of the backup bearing 160, and a safety level of the compressor 100 may be improved as a resonant frequency of the rotary shaft 120 becomes high.

The backup bearing 160 may be arranged to be spaced apart from the second magnetic bearing 156 inwardly in the radial direction of the rotary shaft 120 by means of the first step difference portion 121 and the second step difference portion 125.

Therefore, the backup bearing 160 and the second magnetic bearing 156 may not interfere with each other.

Meanwhile, it is preferable that a first gap formed at the front and rear ends of the collar 151 is greater than that formed at the front and rear ends of the backup bearing 160. This is to avoid collision and damage of the thrust magnetic bearing 150 due to the collar 151 when there is an axial movement of the rotary shaft 120.

Hereinafter, the first gap and the second gap will be described in detail with reference to further still another drawing.

Figure 5:
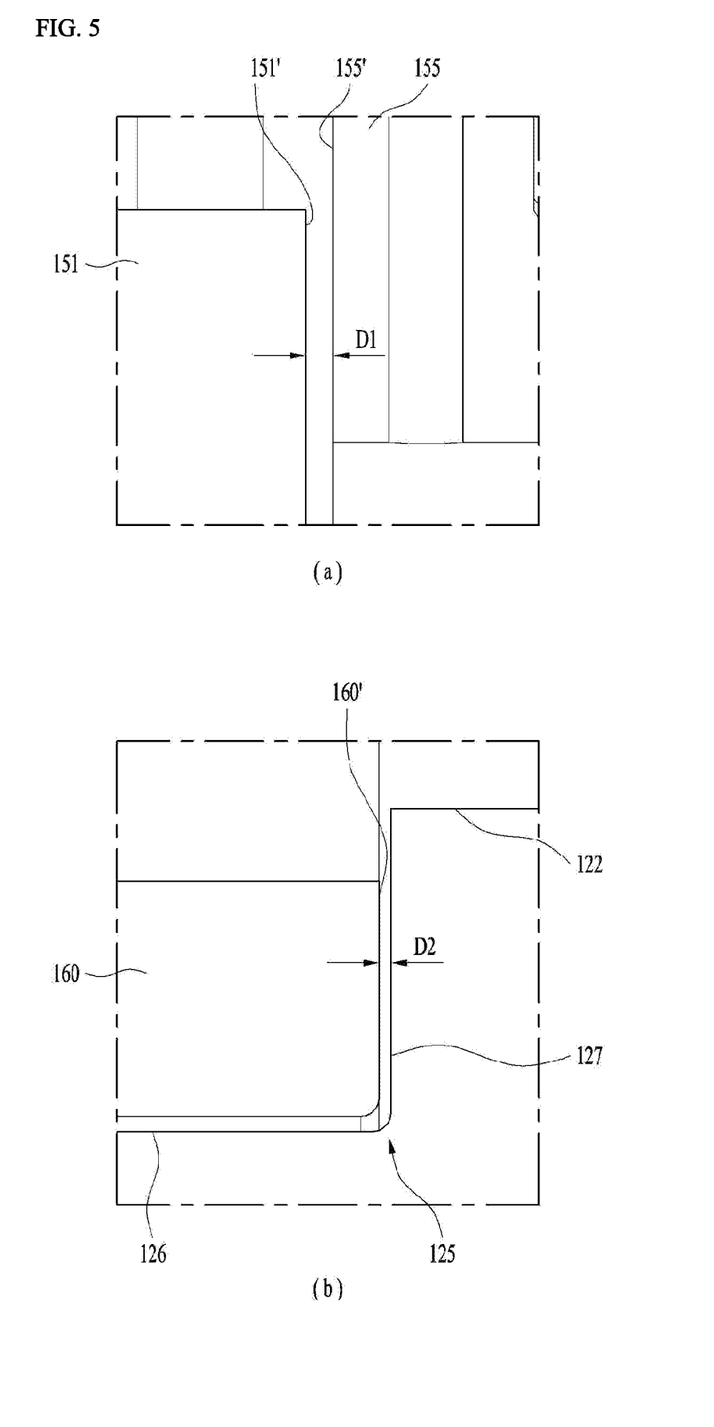

(a) and (b) of FIG. 5 are enlarged views illustrating arrangement of a magnetic bearing and a mechanical backup bearing shown in FIG. 4. In detail, (a) of FIG. 5 illustrates a first gap formed at the front end of the collar, and (b) of FIG. 5 illustrates a second gap formed at the front end of the backup bearing.

Referring to FIGS. 4 and 5, the top end of the collar 151 may be arranged between the first magnetic bearing 155 and the second magnetic bearing 156. Preferably, the top end of the collar 151 may be arranged at the center between the first magnetic bearing 155 and the second magnetic bearing 156.

Therefore, the first gap D1 may respectively be formed between the collar 151 and the first magnetic bearing 155 and between the collar 151 and the second magnetic bearing 155.

That is, the first gap D1 may respectively be formed between the front end of the collar 151 and the rear end of the first magnetic bearing 155 and between the rear end of the collar 151 and the front end of the second magnetic bearing 155.

The backup bearing 160 may be arranged at the aforementioned second step difference portion 125. That is, the second step difference portion 125 may be a backup bearing installation unit for installing the backup bearing 160.

A fixing unit 170 for supporting the rear end of the backup bearing 160 may be coupled to the rear end of the rotary shaft 120.

The second gap D2 may respectively be formed between the backup bearing 160 and the second vertical plane 127 of the second step difference portion 125 and between the backup bearing 160 and the front end of the fixing unit 170.

That is, the second gap D2 may respectively be formed between the front end of the backup bearing 160 and the second vertical plane 127 and between the rear end of the backup bearing 160 and a front support plane 171 of the fixing unit 170.

At this time, the second gap D2 may be smaller than the first gap D1. That is, it is preferable that the second gap D2 is smaller than the first gap D1.

For example, if the aforementioned impeller 110 is rotated, a thrust is generated, wherein the thrust acts on the rotary shaft 120 toward the front of the rotary shaft 120. That is, the rotary shaft 120 receives a force applied to the impeller 110 by rotation of the impeller 110.

The axial (or longitudinal) movement of the rotary shaft 120 by means of the impeller 110 may be avoided by the thrust bearing 150.

In detail, the thrust applied to the rotary shaft 120 by the impeller 110 may be counterbalanced by the thrust magnetic bearing 150.

That is, when a force toward the front of the rotary shaft 120 is applied to the rotary shaft 120, a current may be applied to the thrust magnetic bearing 150 such that a force toward the rear may be applied to the collar 151. In this case, intensity of a current flowing to the second wire 153 wound in the second magnetic bearing 156 may be controlled.

Unlike this case, when a force toward the rear of the rotary shaft 120 is applied to the rotary shaft 120, a current may be applied to the thrust magnetic bearing 150 such that a force toward the rear may be applied to the collar 151. In this case, intensity of a current flowing to the first wire 152 wound in the first magnetic bearing 155 may be controlled.

Since the first gap D1 may respectively be formed between front and rear planes of the collar 151 and an inner side of the thrust magnetic bearing 150, front and rear movement of the rotary shaft 120 may be limited to the front and the rear by the thrust magnetic bearing 150 as much as the first gap D1.

The backup bearing 160 may serve as a mechanical bearing. That is, the backup bearing 160 may be formed to restrict the axial movement of the rotary shaft 120 through physical collision between both sides of the backup bearing 160 and sides opposite to the both sides.

That is, if the force is applied to the front of the rotary shaft 120, the movement toward the front of the rotary shaft 120 may be restricted by collision between the front end of the backup bearing 160 and the second vertical plane 127.

Unlike this case, if the force is applied to the rear of the rotary shaft 120, the movement toward the rear of the rotary shaft 120 may be restricted by collision between the rear end of the backup bearing 160 and the front support plane 171 of the fixing unit 170.

The second gap D2 may respectively be formed between front end of the backup bearing 160 and the second vertical plane 127 and between the rear end of the backup bearing 160 and the front support plane 171 of the fixing unit 170.

Therefore, the front and rear movement of the rotary shaft 120 may be restricted to the front and the rear of the backup bearing 160 as much as the second gap D2.

In the shown embodiment, it is preferable that the first gap D1 between a front plane 151' of the collar 151 and an opposite plane 155' of the thrust magnetic bearing 150, which faces the front plane 151', is greater than the second gap D2 between a front plane 160' of the backup bearing 160 and a second vertical plane 127 which faces the front plane 160'. In this case, the opposite plane 155' of the thrust magnetic bearing 150 may be an opposite plane 155' of the first magnetic bearing 155. That is, the first gap D1 may be a distance between the front plane 151' of the collar 151 and the opposite plane 155' of the first magnetic bearing 155, which faces the front plane 151'.

This is to allow the front plane 160' of the backup bearing 160 to collide with the second vertical plane 127 before the collar 151 collides with the opposite plane 155' when a disturbance such as power failure and external impact occurs.

That is, since the first gap D1 is greater than the second gap D2, collision between the collar 151 and the thrust magnetic bearing 150 and damage of the thrust magnetic bearing 150 may be avoided even though the disturbance occurs.

Meanwhile, the collar 151 and the backup bearing 160 are all arranged at the rear end of the rotary shaft 120. At this time, the backup bearing 160 may be arranged to be closer to the rear end of the rotary shaft 120 than the collar 151. That is, the collar 151 and the backup bearing 160 may be formed sequentially toward the rear end of the rotary shaft 120.

This is to allow the backup bearing 160 to be installed based on the second gap D2 after the collar 151 and the thrust magnetic bearing 150 are installed based on the first gap D1.

That is, since the backup bearing 160 is arranged to be closer to the rear end of the rotary shaft 120 in a length direction, the thrust magnetic bearing 150 may be assembled earlier than the backup bearing 160 during assembly of the compressor 100.

In a state that the thrust magnetic bearing 150 is installed along the circumference of the rotary shaft 120, the rotary shaft 120 may move forward and backward as much as the first gap D1.

Since the second gap D2 is smaller than the first gap D1, when the backup bearing 160 is installed in the rotary shaft 120, the second gap D1 may easily be measured even though the first gap D1 is fixed.

On the other hand, if the collar 151 is installed to be closer to the rear end of the rotary shaft 120 than the backup bearing 160, it is not easy to measure the first gap D1 in a state that the second gap D2 is fixed. That is, in this case, the thrust magnetic bearing 150 should be assembled in a state that the backup bearing 160 is first assembled.

At this time, for measurement of the first gap D1 and arrangement of the thrust magnetic bearing 150, the rotary shaft 120 should move in a front and rear direction. forward and backward.

However, in a state that the backup bearing 160 is first assembled, the front and rear movement of the rotary shaft 120 is restricted as much as the second gap D2, whereby exactness in measurement of the first gap D1 and position selection of the thrust magnetic bearing 150 is reduced.

Therefore, it is preferable that the backup bearing 160 is arranged to be closer to the rear end of the rotary shaft 120 in a length direction than the collar 151.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Industrial applicability is included in the above description.

What is claimed is:

1. A compressor comprising:
a motor including a rotary shaft, a rotor and a stator;
one or more impellers provided at a front end of the rotary shaft, suctioning a refrigerant in an axial direction and compressing the same in a centrifugal direction;
a collar provided at a rear end of the rotary shaft and coupled to the rotary shaft to be extended outwardly in a radial direction of the rotary shaft;
radial bearings provided to support a radial movement of the rotary shaft at a front and rear of the stator;
a thrust bearing formed to prevent an axial movement of the rotary shaft from occurring by supporting the collar;
a mechanical backup bearing formed to prevent the axial movement of the rotary shaft from occurring; and
a fixing unit provided to support the backup bearing at the rear end of the rotary shaft,
wherein the backup bearing is arranged to overlap the thrust bearing in the radial direction of the rotary shaft,
wherein the thrust bearing includes a first bearing arranged at the front of the collar and a second bearing arranged at the rear of the collar,
wherein a length along an axial direction of the backup bearing is smaller than a length along an axial direction of the second bearing, and
wherein the backup bearing is arranged to overlap the second bearing in the radial direction of the rotary shaft such that the length of the backup bearing is located entirely within the length of the second bearing.

2. The compressor of claim 1, wherein the rotary shaft includes first and second step difference portions formed at the rear end, and the collar is coupled to the first step difference portion and the backup bearing is arranged at the second step difference portion.

3. The compressor of claim 2, wherein the second step difference portion is arranged at a rear of the first step difference portion.

4. The compressor of claim 3, wherein the first step difference portion and the second step difference portion are formed continuously toward the rear end of the rotary shaft.

5. The compressor of claim 3, wherein the first step difference portion is formed to have a step difference from an outer circumference of the rotary shaft to an inner side along the radial direction of the rotary shaft, and the second step difference portion is formed to have a step difference from the first step difference portion to the inner side along the radial direction of the rotary shaft.

6. The compressor of claim 5, wherein the first step difference portion includes a first horizontal plane extended in the axial direction and a first vertical plane extended in the radial direction of the rotary shaft, the second step difference portion includes a second horizontal plane extended in the axial direction and a second vertical plane extended in the radial direction of the rotary shaft, and a rear end of the first horizontal plane and a top end of the second vertical plane adjoin each other.

7. The compressor of claim 6, wherein a first gap between a front plane of the collar and an opposite plane of the thrust bearing, which faces the front plane of the collar, is greater than a second gap between a front plane of the backup bearing and the second vertical plane which faces the front plane of the backup bearing.

8. The compressor of claim 7, wherein the first gap is a distance between the front plane of the collar and the opposite plane of the first bearing, which faces the front plane of the collar.

9. The compressor of claim 1, wherein the backup bearing is arranged to be spaced apart from the second bearing in a radial direction of the rotary shaft.

10. A chiller system comprising:
a compressor comprising a motor including a rotary shaft, a rotor and a stator, one or more impellers provided at a front end of the rotary shaft, suctioning a refrigerant in an axial direction and compressing the same in a centrifugal direction, a thrust bearing formed to support the rotary shaft with respect to a longitudinal movement of the rotary shaft, and radial bearings provided to support a radial movement of the rotary shaft at a front and rear of the stator;
a condenser condensing the refrigerant by heat-exchanging the refrigerant compressed by the compressor with cooling water;
an expansion valve expanding the refrigerant condensed by the condenser; and
an evaporator evaporating the refrigerant by heat-exchanging the refrigerant expanded by the expansion valve with cool water and cooling the cool water,
wherein the thrust bearing includes a thrust magnetic bearing supporting a collar, which is extended outwardly along a radial direction of the rotary shaft, by means of a magnetic field, and a mechanical backup bearing formed to prevent an axial movement of the rotary shaft from occurring,
wherein the thrust bearing includes a first bearing arranged at the front of the collar and a second bearing arranged at the rear of the collar,
wherein a length along an axial direction of the backup bearing is smaller than a length along an axial direction of the second bearing, and
wherein the backup bearing is arranged to overlap the second bearing in the radial direction of the rotary shaft such that the length of the backup bearing is located entirely within the length of the second bearing.

11. The chiller system of claim 10, wherein the rotary shaft includes first and second step difference portions formed at the rear end, and the collar is coupled to the first step difference portion and the backup bearing is arranged at the second step difference portion.

12. The chiller system of claim 11, wherein the second step difference portion is arranged at a rear of the first step difference portion.

13. The chiller system of claim 12, wherein the first step difference portion and the second step difference portion are formed continuously toward the rear end of the rotary shaft.

14. The chiller system of claim 13, wherein the first step difference portion is formed to have a step difference from an outer circumference of the rotary shaft to an inner side along the radial direction of the rotary shaft, and the second step difference portion is formed to have a step difference from the first step difference portion to the inner side along the radial direction of the rotary shaft.

15. The chiller system of claim 14, wherein the first step difference portion includes a first horizontal plane extended in the axial direction, and a first vertical plane extended in the radial direction of the rotary shaft, the second step difference portion includes a second horizontal plane extended in the axial direction, and a second vertical plane extended in the radial direction of the rotary shaft, and a rear end of the first horizontal plane and a top end of the second vertical plane adjoin each other.

16. The chiller system of claim 15, wherein a first gap between a front plane of the collar and an opposite plane of the thrust magnetic bearing, which faces the front plane of the collar, is greater than a second gap between a front plane of the backup bearing and the second vertical plane which faces the front plane of the backup bearing.

17. The chiller system of claim 10, wherein a fixing unit is arranged at a rearmost of the rotary shaft.

* * * * *